(12) United States Patent
Kim

(10) Patent No.: US 9,817,590 B2
(45) Date of Patent: Nov. 14, 2017

(54) PLC DATA LOG MODULE WITH BACKUP FUNCTION

(71) Applicant: LSIS CO., LTD., Anyang-si, Gyeonggi-do (KR)

(72) Inventor: Seung Jong Kim, Jincheon-gun (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/851,803

(22) Filed: Sep. 11, 2015

(65) Prior Publication Data

US 2016/0098218 A1    Apr. 7, 2016

(30) Foreign Application Priority Data

Oct. 6, 2014   (KR) .................. 10-2014-0134018

(51) Int. Cl.
| | |
|---|---|
| G06F 12/00 | (2006.01) |
| G06F 13/00 | (2006.01) |
| G06F 13/28 | (2006.01) |
| G06F 3/06 | (2006.01) |
| G06F 11/30 | (2006.01) |
| G06F 11/14 | (2006.01) |

(52) U.S. Cl.
CPC ............ *G06F 3/0619* (2013.01); *G06F 3/065* (2013.01); *G06F 3/0683* (2013.01); *G06F 11/1441* (2013.01); *G06F 11/1443* (2013.01); *G06F 11/1471* (2013.01); *G06F 11/3065* (2013.01)

(58) Field of Classification Search
CPC ...... G06F 3/0619; G06F 3/065; G06F 3/0683; G06F 11/14; G06F 11/1471; G06F 11/3065; G06F 11/3476; G06F 11/1443; G06F 11/1441

USPC ................... 711/161, 162, 103, 104
See application file for complete search history.

(56) References Cited

U.S. PATENT DOCUMENTS

| | | | |
|---|---|---|---|
| 2006/0095659 A1* | 5/2006 | New ................. | G06F 3/0614 711/112 |
| 2007/0186066 A1* | 8/2007 | Desai ................. | G06F 11/1448 711/162 |

(Continued)

FOREIGN PATENT DOCUMENTS

| | | |
|---|---|---|
| CN | 103870570 | 6/2014 |
| CN | 103885854 | 6/2014 |

(Continued)

OTHER PUBLICATIONS

State Intellectual Property Office of the People's Republic of China Application Serial No. 201510742500.7, Office Action dated Aug. 2, 2017, 9 pages.

*Primary Examiner* — Yaima Rigol
*Assistant Examiner* — Shane Woolwine
(74) *Attorney, Agent, or Firm* — Lee, Hong, Degerman, Kang & Waimey PC

(57) ABSTRACT

A PLC data log module with backup function is proposed, the module including an internal memory configured to store the log data and to transmit the stored log data to the external memory, a backup memory configured to back-up the log data transmitted from the internal memory to the external memory and to store the backup data, and a controller configured to transmit the backup data stored in the backup memory to the external memory by controlling the backup memory when the PLC is turned off or reset.

9 Claims, 3 Drawing Sheets

(56) References Cited

U.S. PATENT DOCUMENTS

| | | | | |
|---|---|---|---|---|
| 2008/0019398 A1* | 1/2008 | Genossar | ............. | H04J 3/0632 370/498 |
| 2012/0254120 A1* | 10/2012 | Fang | ................ | G06F 17/30377 707/648 |
| 2014/0223231 A1* | 8/2014 | Mangold | ................ | G11C 16/16 714/22 |

FOREIGN PATENT DOCUMENTS

| | | |
|---|---|---|
| CN | 103902409 | 7/2014 |
| KR | 10-1999-0066532 | 8/1999 |
| KR | 10-1279710 | 6/2013 |

\* cited by examiner

PLC DATA LOG MODULE WITH BACKUP FUNCTION

Pursuant to 35 U.S.C. §119 (a), this application claims the benefit of earlier filing date and right of priority to Korean Patent Application No. 10-2014-0134018, filed on Oct. 6, 2014, the contents of which are hereby incorporated by reference herein in its entirety.

BACKGROUND OF THE DISCLOSURE

Field

The teachings in accordance with the exemplary embodiments of this present disclosure generally relate to a PLC data log module, and more particularly to a PLC data log module with backup function configured to stably store a log data in an external memory under an unstable power state or even when the power is suddenly turned off or reset.

Background

Automation facilities at a traditional industrial site include mechanical devices such as a relay and the like. There is a difficulty in replacing wirings, each at a time, of an inner circuit in the automation facilities in order to change functions of the automation facilities configured with mechanical devices. In order solve the difficulties, a programmable logic controller (PLC) is typically employed.

In general, the PLC functions like a computer, where the PLC receives a signal coming from the facilities and processes according to programmed contents inside the PLC, and outputs the processed signal to the facilities. That is, that a PLC operation is smooth means that automation facilities inside a factory operate efficiently. Thus, a continued monitoring of PLC operation is required.

The PLC is largely controlled in an unmanned manner, and therefore, ex post facto measures must be taken to solve an abnormal operation if it is generated. A series of operations may be monitored or a log data of past history may be stored to check if and how the abnormal operation has been generated.

A conventional PLC data log module stores a relevant device value along with time when a condition set by a user is met, and log data stored in the data log module is stored in a separate memory such as SD card. Meantime, a PLC data log module is used in industrial sites, where a power source is frequently turned off or reset due to unexpected reasons to generate unsmooth storage of log data. In case of conventional technology, a backup FAT (File Allocation Table) area is additionally designated in a memory of the data log module to cope with the problem of the power being turned off, but this conventional method cannot be a solution because there is a limit in data backup when an error occurs in a DIR (Directory Entry) area.

The problems caused by generation of errors for each area inside a memory of the data log module may be enumerated as shown in the following Table 1, where 'O' indicates a normal case, while 'X' shows an abnormal case where an error is generated.

TABLE 1

| | Data area | FAT area | DIR area | Problematic phenomenon |
|---|---|---|---|---|
| 1 | O | O | O | Data normally stored |
| 2 | O | O | X | generation of another file having a size different from that of what is stored (e.g.: different size of file actually stored that has a size different from that of what is stored being stored, albeit 1 Mbyte having been stored) File may not be read, or an arbitrary file may be generated. Stored data uncheckable from SD memory |
| 3 | O | X | O | Albeit folder or file list checkable, a case of file being unreadable may be generated. |
| 4 | O | X | X | File or file list being abnormally generated A case of file being unreadable may be generated, even if folder or file list can be checked. A file having a size different from stored size may be generated, (e.g.: a file of different size is actually stored, albeit 1 Mbyte having been stored) |
| 5 | X | O | O | Unnecessary data in a file appears. |
| 6 | X | O | X | File or file list being abnormally generated A file having a size different from stored size may be generated, (e.g.: a file of different size is actually stored, albeit 1 Mbyte having been stored) |
| 7 | X | X | O | A file can be checked from SD memory, but cannot be accessed. |
| 8 | X | X | X | A file may not be read, or an arbitrary file may be generated. |

When a memory is damaged in a data log module as discussed above, a problem may be generated where a log data collected for a long time cannot be checked.

SUMMARY

The present disclosure has been made to solve the foregoing disadvantages/problems of the prior art and therefore an object of certain embodiments of the present disclosure is to provide a PLC data log module with backup function configured to stably store a log data in an external memory under an unstable power state or even when the power is suddenly turned off or reset.

Technical problems to be solved by the present disclosure are not restricted to the above-mentioned description, and any other technical problems not mentioned so far will be clearly appreciated from the following description by the skilled in the art.

The present disclosure is to solve at least one or more of the above problems and/or disadvantages in whole or in part and to provide at least advantages described hereinafter. In order to achieve at least the above objects, in whole or in part, and in accordance with the purposes of the present disclosure, as embodied and broadly described, and in one general aspect of the present invention, there is provided a PLC data log module with backup function configured to generate a log data based on a PLC CPU's device value collected when a set condition is met and transmit the generated log data to an external memory, the PLC data log module comprising:

an internal memory configured to store the log data and to transmit the stored log data to the external memory;

a backup memory configured to back-up the log data transmitted from the internal memory to the external memory and to store the backup data; and a controller configured to transmit the backup data stored in the backup memory to the external memory by controlling the backup memory when the PLC is reset or the PLC become a turned-on state from a turned-off state.

Preferably, but not necessarily, the backup memory may transmit the backup data to the internal memory in response to control of the controller, and the internal memory transmits the backup data transmitted from the backup memory to the external memory.

Preferably, but not necessarily, the controller may control the backup memory in order to allow the backup memory to transmit a previous backup data, when a power-off or a power-reset time of the PLC is prior to transmission of the log data to the external memory.

Preferably, but not necessarily, the controller may control the backup memory in order to allow the backup memory to transmit a previous backup data, when a power-off or a power-reset time of the PLC is when the log data is being transmitted to the external memory.

Preferably, but not necessarily, the controller may control the backup memory in order to allow the backup memory to transmit a previous backup data, when a power-off or a power-reset time of the PLC is prior to the log data being backed-up to the backup memory, although the log data has been already completed in being transmitted to the external memory.

Preferably, but not necessarily, the controller may control the backup memory in order to allow the backup memory to transmit a newly backed-up data, when a power-off or a power-reset time of the PLC is when the log data has been already completed in being transmitted to the external memory, and the log data has been completed in being backed-up to the backup memory.

Preferably, but not necessarily, the controller may determine whether there is a bad data by reading a data of a predetermined size from a last point among the data stored in the external memory, when the backup data has been completed in being transmitted to the external memory.

Preferably, but not necessarily, the controller may delete a data positioned between the bad data and a last point subsequent to the bad data when it is determined that there exists a bad data, and substitute the deleted data with a null value.

Preferably, but not necessarily, the controller may determine a data not sequential in terms of time sequence or a data unmatched to storage format as a bad data by comparing time information of data read from the external memory.

Preferably, but not necessarily, the controller may determine a state whether the external memory can store the backup data by receiving the backup data, and transmit the backup data stored in the backup memory to the external memory when the status is determined to be as a backup-able status.

Preferably, but not necessarily, the controller may determine it as the backup-able status when the external memory is connected to PLC data log module and a data exists inside the external memory.

The PLC data log module with backup function according to the exemplary embodiments of the present disclosure has an advantageous effect in that a log data transmitted from the PLC data log module to an external memory can be stored in a backup memory, and the backup data stored in the backup memory can be transmitted to the external memory, whereby the log data can be stored in the external memory under an unstable power state, or even when the power is suddenly turned off or reset.

BRIEF DESCRIPTION OF THE DRAWINGS

The accompanying drawings included to provide a further understanding of the disclosure and incorporated in and constituted as a part of this application, illustrate embodiment(s) of the disclosure, and together with the description, serve to explain the principle of the disclosure. In the drawings.

DETAILED DESCRIPTION

Figure 1:
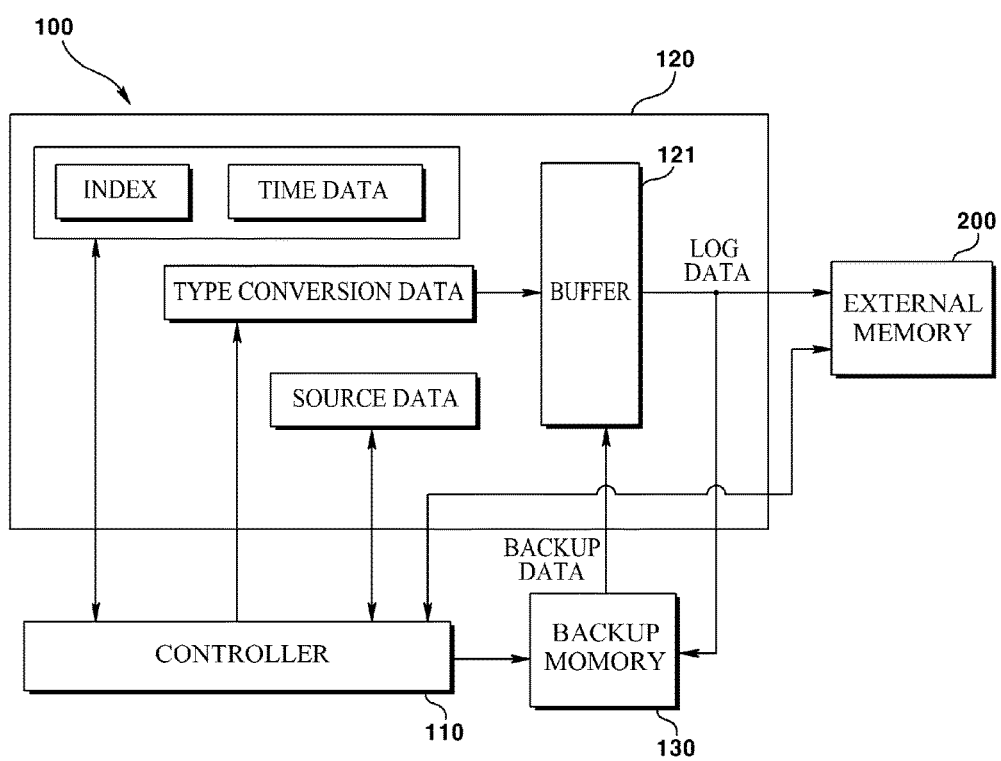
FIG. 1 is a schematic block diagram illustrating a PLC data log module according to an exemplary embodiment of the present disclosure.

Various exemplary embodiments will be described more fully hereinafter with reference to the accompanying drawings, in which some exemplary embodiments are shown.

Advantages and features of the present disclosure may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, a PLC data log module with backup function according to an exemplary embodiment of the present disclosure will be described more fully hereinafter with reference to the accompanying drawings.

FIG. 1 is a schematic block diagram illustrating a PLC data log module according to an exemplary embodiment of the present disclosure.

Referring to FIG. 1, a PLC data log module (100) according to an exemplary embodiment of the present disclosure may include a controller (110), an internal memory (120) and a backup memory (130), where the PLC data log module (100) may collect a PLC CPU's device value when a condition set by a user is met, and store a log data stored along with time in an external memory (200).

The controller (110) may collect the PLC CPU's device value ('source data') and convert the collected source data to generate a log data. At this time, the controller (110) may add an index value and a time data to the collected source data, and convert to a type set by a parameter to generate a log data, where the generated log data is stored in the internal memory (120) in a data row using the time data and index value.

Furthermore, the controller (110) may control the backup memory (130) to allow the backup data stored in the backup memory (130) to be transmitted to the internal memory (120) when the PLC data log module (100) becomes a turned-on state (including reset state) from a turned-off state. At this time, the backup data transmitted from the backup memory (130) to the internal memory (120) by the control of the controller (110) may be transmitted to the external memory (200) through the internal memory (120).

Furthermore, the controller (110) may determine whether a bad data exists in the data stored in the external memory (200), when the backup data transmitted to the external memory (200) through the internal memory (120) by being transmitted from the backup memory (130) is stored in the external memory (200).

At this time, the controller (110) may determine whether the bad data exists by reading out a data from a last point among the data stored in the external memory (200) as much as a predetermined size. When the bad data is present, the controller (110) may compare time information of read data and determine as a bad data a data not sequential in terms of time sequence, or not matching to storage format.

If there exists a bad data, the controller (110) deletes the bad data and a data positioned between the bad data and the last point, and substitutes with a null value (0x00) lest that the bad data should be displayed. The data stored in the external memory (200) as null value is not displayed in a file, such that it seems to a user that the bad data is deleted.

Meantime, the controller (110) may controllably allow the back memory (130) to transmit the backup data ('previous backup data') stored in the backup memory (130) to the internal memory (120) before the PLC power is turned off or reset, when a point the PLC power is turned off or reset is prior to the log data being transmitted to the external memory (200).

Furthermore, the controller (110) may controllably allow the backup memory (130) to transmit the previous backup data to the internal memory (120) when a point the PLC power is turned off or reset is when the log data is being transmitted to the external memory (200). In addition, the controller (110) may controllably allow the backup memory (130) to transmit the previous backup data to the internal memory (120), when a point the PLC power is turned off or reset is prior to the log data being backed up to the external memory (200), albeit being completed in transmission to the external memory (200).

Furthermore, the controller (110) may controllably allow the backup memory (130) to transmit a newly-backed up data to the internal memory (120), when a point the PLC power is turned off or reset is a point the log data is completed in transmission to the external memory (200) and a point subsequent to the log data being completed in being backed up to the backup memory (130).

As discussed in the foregoing, the backup data transmitted in response to power off (reset) point may be wrapped up as in the following Table 2.

TABLE 2

| power OFF(Reset) point | Prior to log data being transmitted | Under the log data being transmitted | Completion of log data transmission & prior to backup | Completion of log data & completion of backup |
|---|---|---|---|---|
| Backup data | Previous backup data | Previous backup data | Previous backup data | Newly backed up data |

Meantime, the controller (110) may determine whether the external memory (200) is in a state of receiving and storing the backup data, and if it is determined that the external memory (200) is in a state of receiving and storing the backup data, the controller (110) may transmit the backup data stored in the backup memory (130) to the external memory (200) by controlling the backup memory (130).

At this time, the controller (110) determines as being in a backup-able state when the external memory (130) is connected to the PLC data log module (100) and data is present in the external memory (200).

The internal memory (120) may store the source data collected by the controller (110) and store the log data generated by the controller (110), and transmit the log data to the external memory (200) in the order of storage, when the stored log data exceeds a capacity of the internal memory (120), where the external memory (200) may store the log data transmitted from the internal memory (120).

Furthermore, the internal memory (120) may transmit the backup data transmitted from the backup memory (130) to the external memory (200) when the backup data is transmitted from the backup memory (130).

At this time, the internal memory (120) may transmit the backup data transmitted from the backup memory (130) to the external memory (200) when the backup data is transmitted from the backup memory (130), regardless of whether the internal memory (120) is exceeded of capacity.

Meantime, the log data or backup data transmitted from the internal memory (120) may be transmitted to the external memory (200) in an SPI (Serial Peripheral Interface) communication method. The internal memory (120) may include a buffer (121) temporarily stored with the log data, where the buffer (121) may transmit the log data to the external memory (200) in the order of storage when the stored data exceeds its capacity. Furthermore, the backup data transmitted from the backup memory (130) may be also transmitted to the external memory (200) through the buffer (121).

Meantime, the buffer (121) may be comprised of FAT (File Allocation Table) Cache internally stored with FAT-related data, DIR Cache stored with DIR related data and Data Cache stored with data.

The backup memory (130) may store the log data transmitted from the internal memory (120), particularly the buffer (121) of the internal memory (120) to the external memory (200). At this time, the data stored in the backup memory (130) may include FAT (File Allocation Table) information, DIR information and data. At this time, the data may include the data collected from the PLC data log module (100), and the FAT information and the DIR information may include a file name, a path and a value calculated in the generation order.

Furthermore, the backup memory (130) may transmit the backup data to the internal memory (120) in response to the control of the controller (110). At this time, the backup memory (130) may transmit the previous backup data to the internal memory (120) in response to the control of the controller (110) or transmit the newly backed up backup data to the internal memory (120).

Hereinafter, operations of PLC data log module with backup function according to an exemplary embodiment of the present disclosure thus explained will be described step by step.

Figure 2:
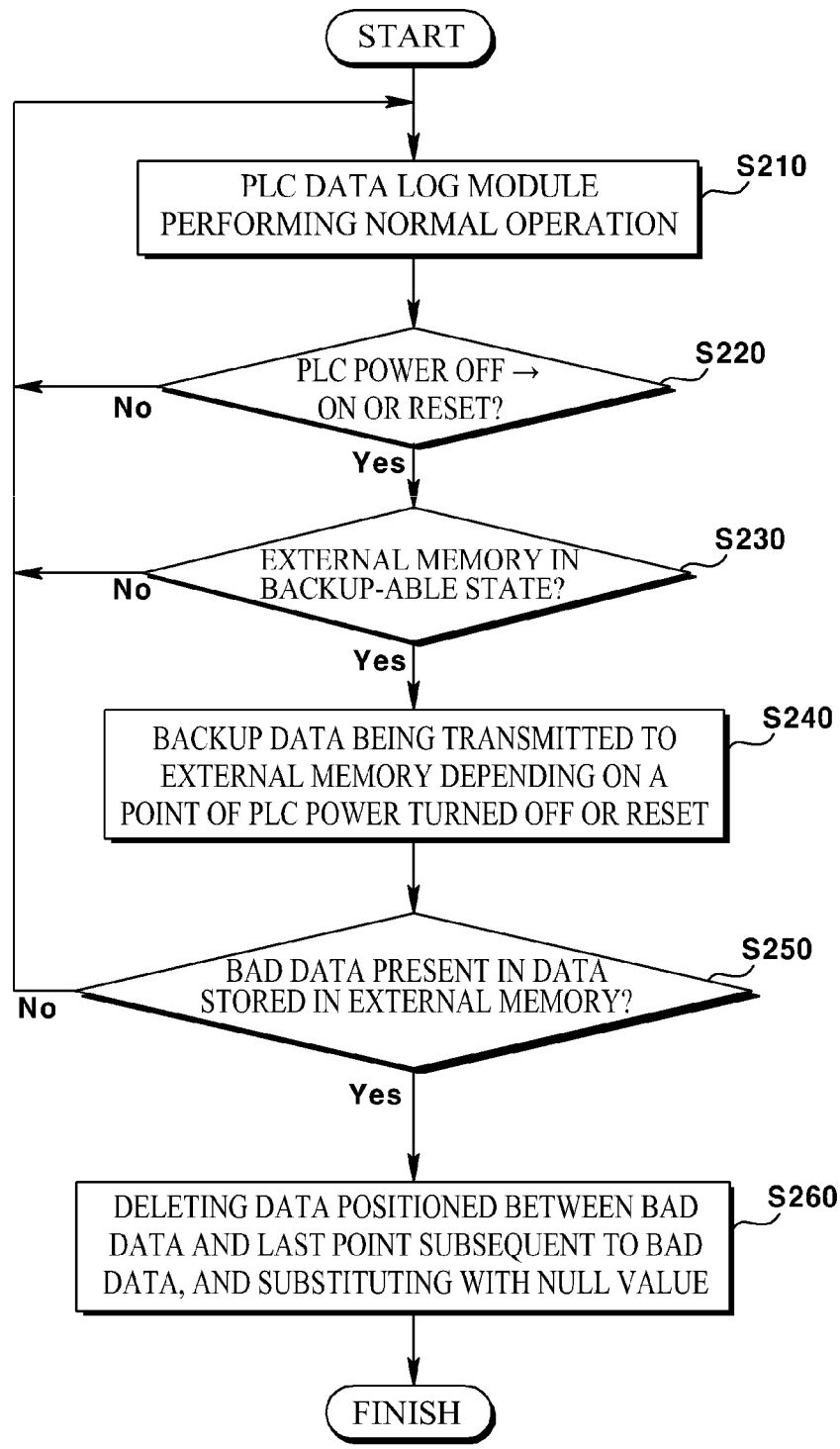
FIG. 2 is a flowchart illustrating an operation of a PLC data log module with backup function according to an exemplary embodiment of the present disclosure.
Figure 3:
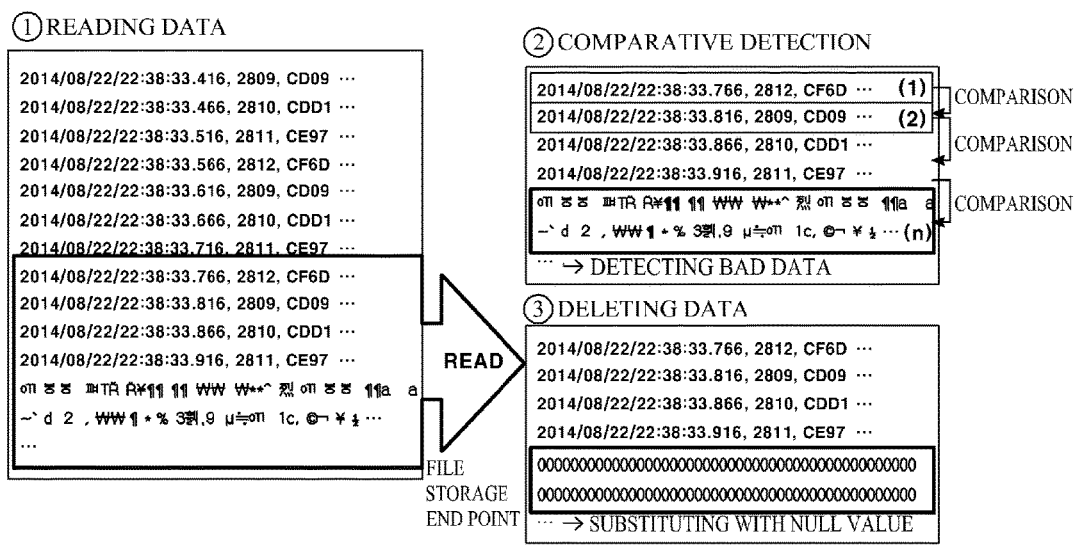
FIG. 3 is a flowchart illustrating a process of treating a bad data stored in an external memory by a PLC data log module with backup function according to an exemplary embodiment of the present disclosure.

FIG. 2 is a flowchart illustrating an operation of a PLC data log module with backup function according to an exemplary embodiment of the present disclosure, and FIG. 3 is a flowchart illustrating a process of treating a bad data stored in an external memory by a PLC data log module with backup function according to an exemplary embodiment of the present disclosure.

First, the PLC data log module may perform a normal operation (S210) and determine whether the PLC power is turned off, and then turned on, and reset (S220). At this time, that the PLC data log module performs a normal operation means that the PLC data log module collects a relevant device value ('source data') in response to a condition set by a user, converts the collected source data to generate a log data, transmits the generated log data to the external memory, and generates the backup data by backing up the transmitted log data. In other words, the PLC data log module performs a normal operation, and generates a backup data by storing the log data transmitted to the external memory.

At this time, as a result of determination at S220, if it is determined that the PLC power is not turned off and turned on, or is not reset (S220—No), the PLC data log module performs a normal operation (S210).

Meantime, as a result of determination at S220, if it is determined that the PLC power is turned off and turned on, or is reset (S220—Yes), the PLC data log module determines whether the external memory is in a state of receiving and backing up the backup data (S230). At this time, the PLC data log module determines whether the external memory is connected to the PLC data log module and data is present in the external memory.

The backup cannot be realized when the external memory is not connected to the PLC data log module, and the backup is not performed, determining that a new external memory is connected when no data is available in the external memory.

Thus, as a result of determination at S230, if it is determined that the external memory is not in a backup-able state (S230—No), that is, if the external memory is not connected to the PLC data log module, and even if the external memory is connected to the PLC data log module, no data is available in the external memory, the PLC data log module performs a normal operation (S210).

Meanwhile, as a result of determination at S230, if it is determined that the external memory is in a backup-able state (S230—Yes), the PLC data log module transmits the backup data to the external memory in response to a point the PLC power is turned off or reset (S240). At this time, the PLC data log module transmits the previous backup data to the external memory, if the point of the PLC power being turned off or being reset is prior to transmission of log data.

Furthermore, the PLC data log module transmits the previous backup data to the external memory, if the point of the PLC power being turned off or being reset is the midst of transmitting the log data. In addition, the PLC data log module transmits the previous backup data to the external memory, if the point of the PLC power being turned off or being reset is prior to backup of transmitted log data, although the transmission of log data has been already completed.

Furthermore, the PLC data log module transmits a newly backed up back to the external memory, if the point of the PLC power being turned off or being reset is a point where transmission of log data is completed and backup of the transmitted log data is completed.

Meantime, the backup data may differ, depending on a point of the PLC power being turned off or being reset, and therefore, a bad data may be stored in the external memory.

However, the PLC data log module according to an exemplary embodiment of the present disclosure determines whether there is a bad data among the data stored in the external memory, subsequent to transmission of the backup data to the external memory according to S240 (S250). At this time, from a last point according to an exemplary embodiment of the present disclosure determines whether there is a bad data in the data stored in the external memory from a last point by reading out the data as much as a predetermined size (See FIG. 3①).

At this time, as a result of S250, if it is determined that there is present a bad data, from a last point compares time information of data read out from the external memory and determines as a bad data a data not sequential in time sequence or not matching to storage format (See FIG. 3②).

Meanwhile, as a result of S250, if it is determined at S250 that there is present no bad data (S250—No), the PLC data log module performs a normal operation (S210).

Meanwhile, as a result of S250, if it is determined that there is present a bad data (S250—Yes), the PLC data log module deletes the bad data and a data positioned between the bad data and the last point, and substitutes with a null value (0x00) (S260) (See FIG. 3③).

Although the PLC data log module with backup function according to the present disclosure has been explained according to exemplary embodiments, the present disclosure is not limited thereto, and various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

Thus, the above-mentioned t PLC data log module with backup function according to the exemplary embodiment of the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents.

What is claimed is:

1. A programmable logic controller (PLC) data log module with backup function configured to generate a log data based on a PLC CPU's device value collected when a set condition is met and to transmit the generated log data to an external memory, the PLC data log module comprising:
   an internal memory configured to store the log data and to transmit the stored log data to the external memory;
   a backup memory configured to back-up the log data transmitted from the internal memory to the external memory and to store the backup data; and
   a controller configured to:
   determine whether the PLC has been reset or if the PLC has been changed to a turned-on state from a turned-off state;
   transmit the backup data stored in the backup memory to the external memory when it is determined that the PLC has been reset or that the PLC has been changed to a turned-on state from a turned-off state;
   read data of a predetermined size stored in the external memory starting from a last point of the data stored in the external memory when all of the backup data has been transmitted to the external memory;
   determine whether bad data is included in the data of the predetermined size read from the external memory; and
   delete data positioned between data determined to be bad data and a last point subsequent to the position of the bad data and substitute the deleted data with a null value.

2. The PLC data log module of claim 1, wherein the backup memory transmits the backup data to the internal memory in response to control of the controller, and the internal memory transmits the backup data transmitted from the backup memory to the external memory.

3. The PLC data log module of claim 1, wherein controller controls the backup memory in order to allow the backup memory to transmit a previous backup data, when a power-off or a power-reset time of the PLC is prior to transmission of the log data to the external memory.

4. The PLC data log module of claim 1, wherein the controller controls the backup memory in order to allow the backup memory to transmit a previous backup data, when a power-off or a power-reset time of the PLC is when the log data is being transmitted to the external memory.

5. The PLC data log module of claim 1, wherein the controller controls the backup memory in order to allow the backup memory to transmit a previous backup data, when a power-off or a power-reset time of the PLC is prior to the log data being backed-up to the backup memory, although the log data has been already completed in being transmitted to the external memory.

6. The PLC data log module of claim 1, wherein the controller controls the backup memory in order to allow the backup memory to transmit a newly backed-up data, when a power-off or a power-reset time of the PLC is when the log data has been already completed in being transmitted to the external memory, and the log data has been completed in being backed-up to the backup memory.

7. The PLC data log module of claim 1, wherein bad data includes data which does not match a storage format or data which is not sequential in terms of time sequence when comparing time information of data read from the external memory.

8. The PLC data log module of claim 1, wherein the controller determines a status whether the external memory can store the backup data by receiving the backup data, and transmits the backup data stored in the backup memory to the external memory when the status is determined to be as a backup-able status.

9. The PLC data log module of claim 8, wherein the controller determines it as the backup-able status when the external memory is connected to PLC data log module and a data exists inside the external memory.

* * * * *